(12) United States Patent
Ruivenkamp

(10) Patent No.: US 9,926,048 B2
(45) Date of Patent: Mar. 27, 2018

(54) HOISTING SYSTEM AND ACCOMPANYING CONNECTOR CATCH ASSEMBLY

(71) Applicant: HALLCON B.V., Maasland (NL)

(72) Inventor: Johan Ruivenkamp, Maasland (NL)

(73) Assignee: HALLCON B.V., Maasland (NL)

( * ) Notice: Subject to any disclaimer, the term of this patent is extended or adjusted under 35 U.S.C. 154(b) by 0 days.

(21) Appl. No.: 14/758,899

(22) PCT Filed: Dec. 17, 2013

(86) PCT No.: PCT/NL2013/050908
§ 371 (c)(1),
(2) Date: Jul. 1, 2015

(87) PCT Pub. No.: WO2014/107109
PCT Pub. Date: Jul. 10, 2014

(65) Prior Publication Data
US 2015/0336775 A1    Nov. 26, 2015

(30) Foreign Application Priority Data

Jan. 4, 2013  (EP) ..................................... 13150271

(51) Int. Cl.
*B63C 3/06* (2006.01)
*B63C 3/12* (2006.01)
(Continued)

(52) U.S. Cl.
CPC ............ *B63B 23/58* (2013.01); *B65G 67/603* (2013.01); *B65G 67/62* (2013.01); *B66C 1/66* (2013.01);
(Continued)

(58) Field of Classification Search
CPC .. B66F 7/0641; B66F 7/08; B66F 7/02; B66F 11/00; B66F 7/00; E02C 5/00; E02C 1/00;
(Continued)

(56) References Cited

U.S. PATENT DOCUMENTS 1,748,500 A * 2/1930 Thaden ..................... B64F 1/14
                                                          244/115
2,986,750 A * 6/1961 Herreshoff .............. B63B 23/58
                                                          114/368
(Continued)

FOREIGN PATENT DOCUMENTS

DE         3900885 A1     7/1990
DE        10025891 A1    11/2001
(Continued)

OTHER PUBLICATIONS

International Search Report dated Jan. 24, 2014 in PCT/NL2013/050908 filed Dec. 17, 2013.

*Primary Examiner* — Benjamin F Fiorello
*Assistant Examiner* — Edwin J Toledo-Duran
(74) *Attorney, Agent, or Firm* — Oblon, McClelland, Maier & Neustadt, L.L.P.

(57) ABSTRACT

A hoisting system, including: a hoisting crane including a hoisting cable, a craft, and a connector catch assembly for interconnecting the hoisting crane and the craft or a load/cargo on the craft. The connector catch assembly includes: a connector body, and a connector catch having a funnel-shaped trap-cage, whereby one of the connector body and the connector catch is attached to the hoisting cable and the other of the connector body and the connector catch is attached to the craft or the load on the craft. A wide side of the funnel shaped trap-cage is directed toward the connector body on approaching one another, whereas an opposite narrow side of the funnel shaped trap-cage has the connector catch mounted therein for releasably holding the connector body.

13 Claims, 6 Drawing Sheets

Figure 1:
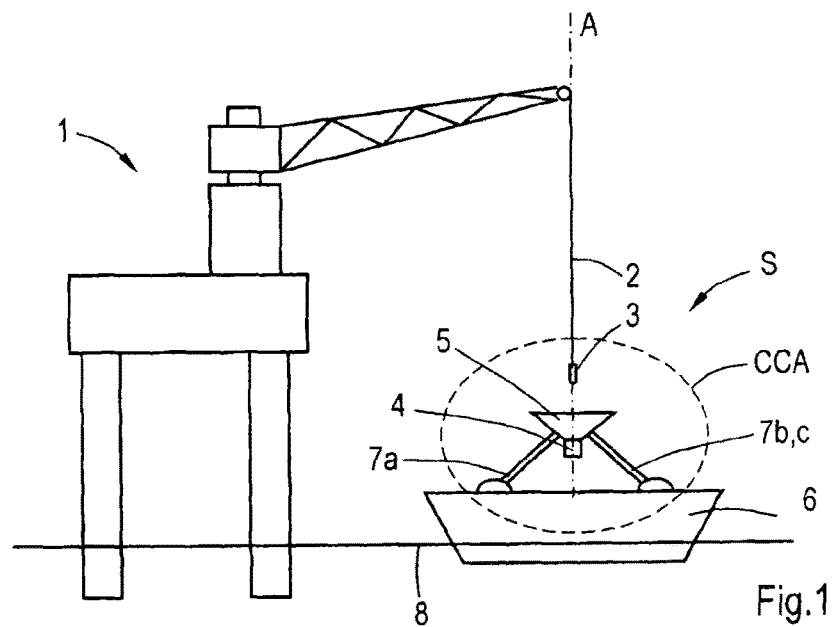

(51) Int. Cl.
  *B63B 23/58*   (2006.01)
  *B65G 67/60*   (2006.01)
  *B65G 67/62*   (2006.01)
  *B66C 1/66*    (2006.01)
  *B66C 13/02*   (2006.01)
  *B63B 27/30*   (2006.01)
  *B63B 17/00*   (2006.01)

(52) U.S. Cl.
  CPC .............. *B66C 13/02* (2013.01); *B63B 27/30* (2013.01); *B63B 2017/0072* (2013.01)

(58) Field of Classification Search
  CPC ....... E02C 1/02; E02C 3/00; B63B 2027/165; B63B 23/40; B63B 27/10; B66C 13/02; B66C 23/18; B66C 23/52
  USPC ...... 405/3, 86; 212/307, 309, 310, 311, 272, 212/308; 254/277; 294/82.16
  See application file for complete search history.

(56) References Cited

U.S. PATENT DOCUMENTS

| 3,056,267 | A | * | 10/1962 | McRee | E02D 9/005 125/23.01 |
| 3,445,133 | A | * | 5/1969 | Reischl | B66C 1/66 294/82.1 |
| 3,744,070 | A | * | 7/1973 | Shaw | B60P 3/1033 114/280 |
| 4,724,970 | A | | 2/1988 | Hans Kuehn | |
| 5,593,050 | A | * | 1/1997 | Lange | B66B 5/06 212/294 |
| 5,943,977 | A | * | 8/1999 | Womack | B63B 35/816 114/242 |
| 6,068,066 | A | * | 5/2000 | Byrt | E21B 15/02 173/152 |
| 6,347,424 | B1 | * | 2/2002 | Vatne | B63B 27/14 14/34 |
| 7,107,925 | B2 | * | 9/2006 | Wille | B63B 22/026 114/230.15 |
| 2007/0222244 | A1 | | 9/2007 | Cornwell | |
| 2011/0170988 | A1 | * | 7/2011 | Perry | B63B 27/30 414/138.2 |

FOREIGN PATENT DOCUMENTS

| DE | 202012100556 U1 | 3/2012 |
| EP | 0228050 A2 | 7/1987 |
| FR | 2243140 A1 | 4/1975 |
| WO | 2012/130807 A1 | 10/2012 |

* cited by examiner

HOISTING SYSTEM AND ACCOMPANYING CONNECTOR CATCH ASSEMBLY

The present invention relates to a hoisting system and a connector catch assembly for application in such a system.

Such systems are known in various embodiments, for example related to small crafts as a whole, such as seagoing crafts, transport vessels and the like or shipping containers or other objects to be lifted from or lowered on deck.

In some cases, a connector catch assembly is mounted on a seagoing craft or fixed to a container located onboard a transport vessel, and the hoisting crane is located ashore, on a platform structure fixed in the sea bedding, or on a large, relatively stable vessel. In such cases, the hoisting crane is used to connect the hoisting cable and connector body to the connector catch assembly and to subsequently lift the object, e.g., the sea-craft or container, onboard of a platform structure or vessel, or alternatively to lower the object from the quayside, platform structure or vessel into the water or on board of a transport vessel.

The American patent U.S. Pat. No. 2,986,750, on the name of Herreshoff, discloses an apparatus for launching sea craft onto the sea surface and recovering it there from, comprising a lifting connector body of a sling attached to the sea craft and a suspended connector catch arranged to be lowered toward and raised from said lifting connector body, characterized by a transverse arm fixed to and extending through the lifting connector body, the arm providing a pair of downwardly extending connector body portions, one being positioned on one side of the lifting connector body and the other on the other side of the lifting connector body, a guiding line having one end connected to the bill portion of the suspended connector body and its other end portion connected to tensioning means, an upper fixed pulley and a lower movable pulley interposed in said line between its ends, the pulley having a shackle for reception in one of the connector body portions of the transverse arm when the craft is to be launched on the sea surface and for reception in the other of the connector body portions of the transverse arm when the craft is to be recovered from the sea surface.

The U.S. Pat. No. 4,624,450, on the name of Paccar Inc., discloses a constant tension hoisting system for raising and lowering an object between a platform and a surface undergoing vertical motion relative to the platform, such as raising and lowering a lifeboat from a seagoing vessel to the sea in rough weather. The system operates in a normal hoisting mode to raise or lower the object, and in a constant tension mode when the object is supported on the surface, and a slack condition exists in the cable. This system functions once the connector body has been attached.

These known systems have the common disadvantage that, when hoisting is necessary in conditions where one of the assembly and a hoisting crane is stationary and the other is moving, for instance on a dwelling sea, it is dangerous to bring the connector body to the connector catch, in spite of the provisions made to improve the safety. As a result, sometimes operating personnel becomes injured, especially in rough circumstances such as at sea with high waves.

A goal of the invention is to provide an improved hoisting system of the type mentioned above. In particular, the invention has as a goal to provide a system that allows hoisting with reduced risk for persons, even in situations where the craft and crane are moving relative to each other.

This goal is realized by a hoisting system according to claim 1.

Due to the presence of the funnel-shaped trap-cage and the wide side thereof being directed away from the connector catch, and the narrow side of the trap-cage at or near the connector catch, the positioning of the connector body and the trap-cage relative to each other occurs automatically. The trap-cage with its funnel shaped configuration effects a guiding when the connector catch and the trap-cage are off-centre, toward each other. Waves and a dwelling sea will lead to the connector body and the funnel shaped trap-cage hitting each other, but it will end up in the right place, with the connector body at the connector catch, without the need for any active control or action by a person operating the crane or craft.

Another advantage of the invention is that the required amount of effort and time to connect the two connector parts is reduced, which also reduces the operating costs of the crane or craft or load placed therein.

Advantageously the connector body or the connector catch is attached to the hoisting cable, in which respective mechanically reversed cases the connector catch or the connector body is respectively attached to the craft directly or indirectly through some cargo or load on the craft such as a container.

In a specific embodiment of the invention, the system is provided with heave compensation means for reducing tension peaks in the hoisting cable occurring due to relative movements of the crane and craft, e.g. as a result of dwell or waves. By reducing the tension, the lifespan of the system is prolonged and its safety is enhanced.

Advantageously, the heave compensation means comprise a gas-spring, as a relatively simple, highly reliable and effective embodiment of these means. In particular, the stiffness of the gas-spring may be adjustable, as a way of adapting the degree of tension-reduction to the requirements of the specific circumstances.

In an embodiment of the system, the connector catch assembly is provided with means for adjusting the position of the assembly relative to the object in a direction perpendicular to the central axis of the funnel of the trap-cage.

By adjusting the position of the trap-cage, the inclination of the ship, shipping container or other kind of load hoisted by the cable with respect to the horizontal is adjustable, to a certain degree. In this embodiment, the connector catch assembly may be positioned on at least one leg that extends in a direction with a component parallel to the central axis of the funnel of the trap-cage, wherein the at least one leg has an adjustable length to adjust an angular orientation of the trap-cage and thereby the position of the connector catch in the direction perpendicular to the central axis of the funnel of the trap-cage. As such, the leg does not only carry the trap-cage and connector catch, but also allows for the adjustment of the position with respect to the object to which it is linked.

In a specific embodiment, the trap-cage has an opening angle that decreases towards the narrow side of the funnel, which allows for an improved guidance of the connector body towards the connector catch.

The invention also relates to a connector catch assembly according to claim 8.

Figure 2A:
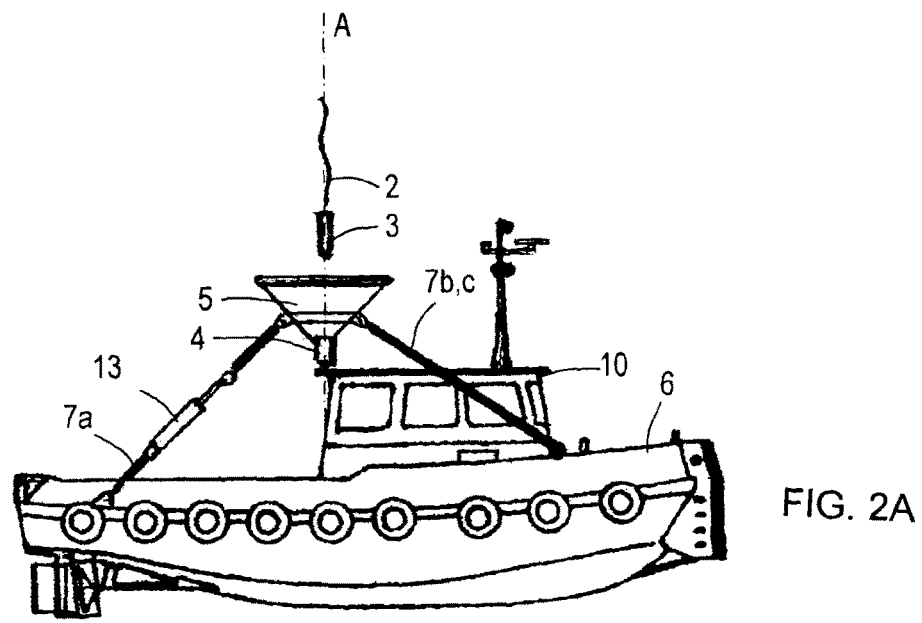
Figure 2B:
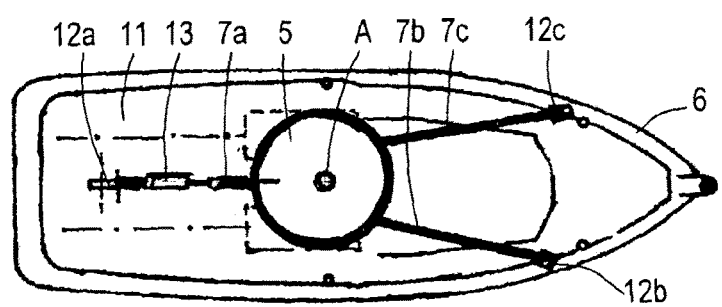
Figure 3A:
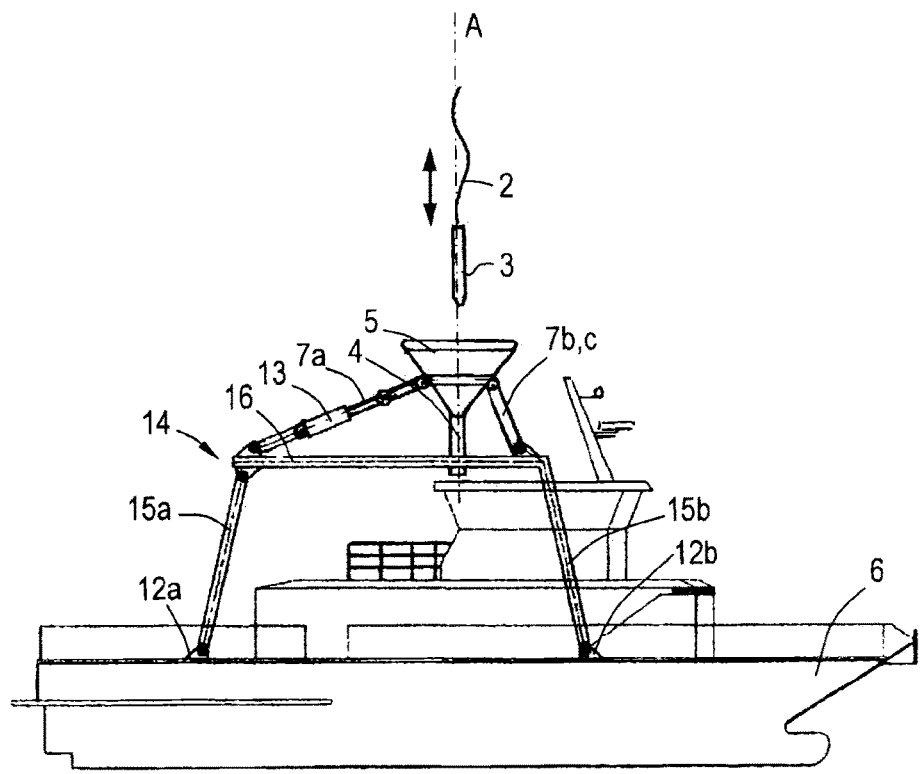
Figure 3B:
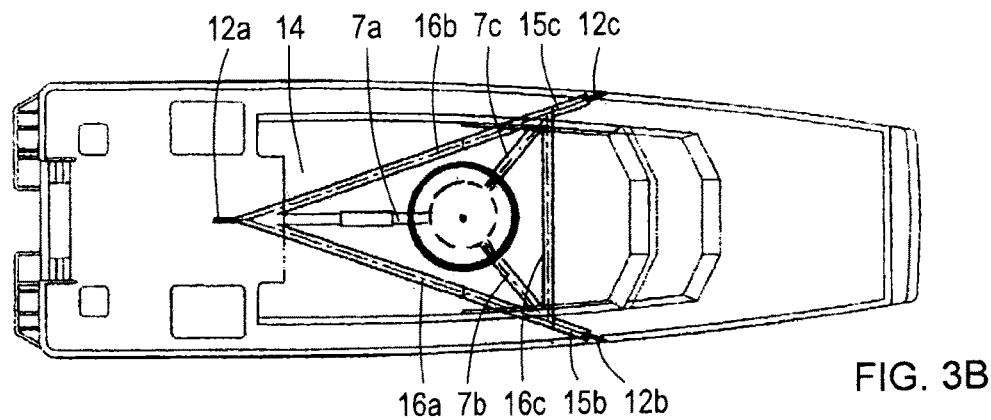
Figure 4:
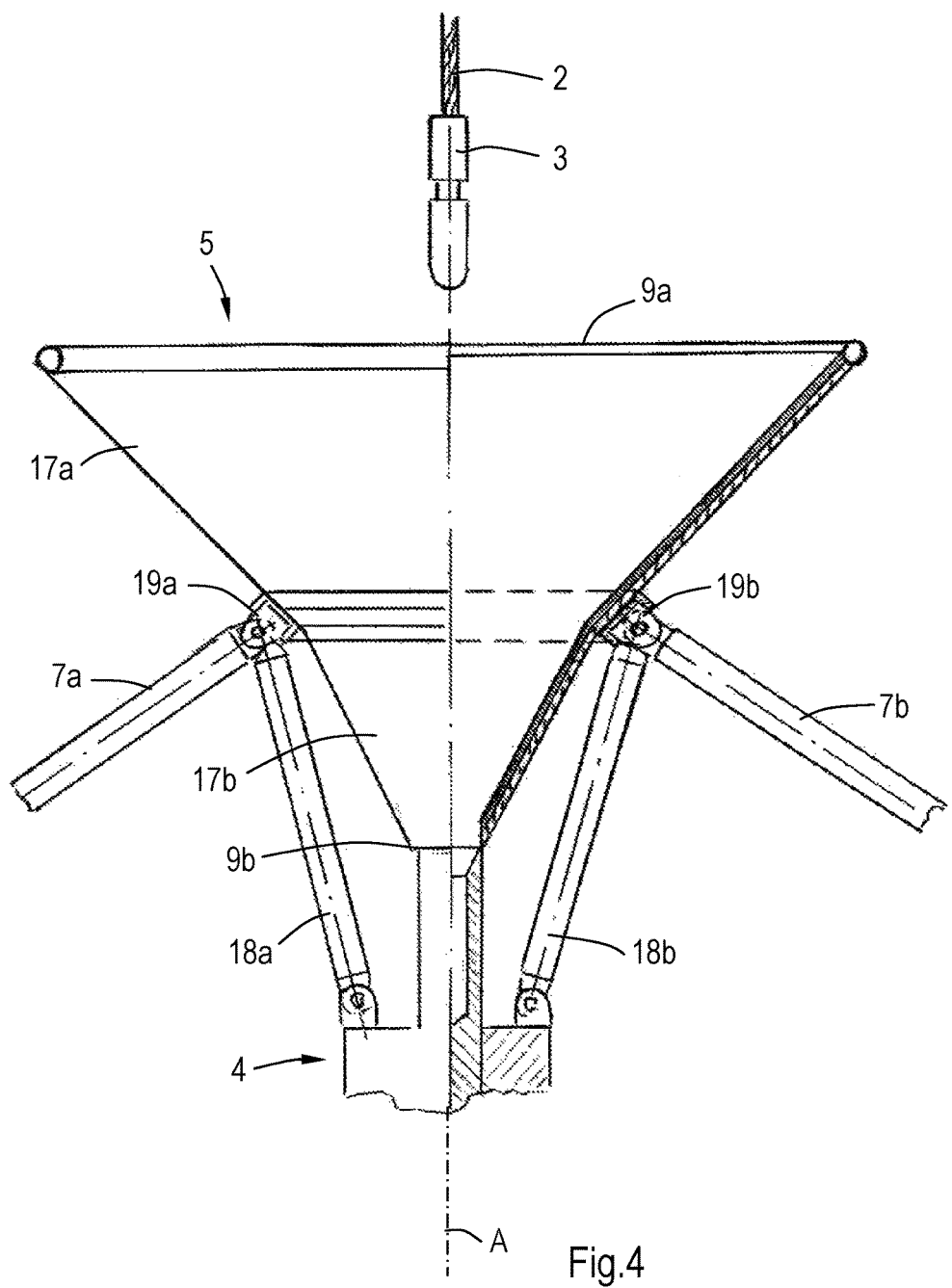
Figure 5:
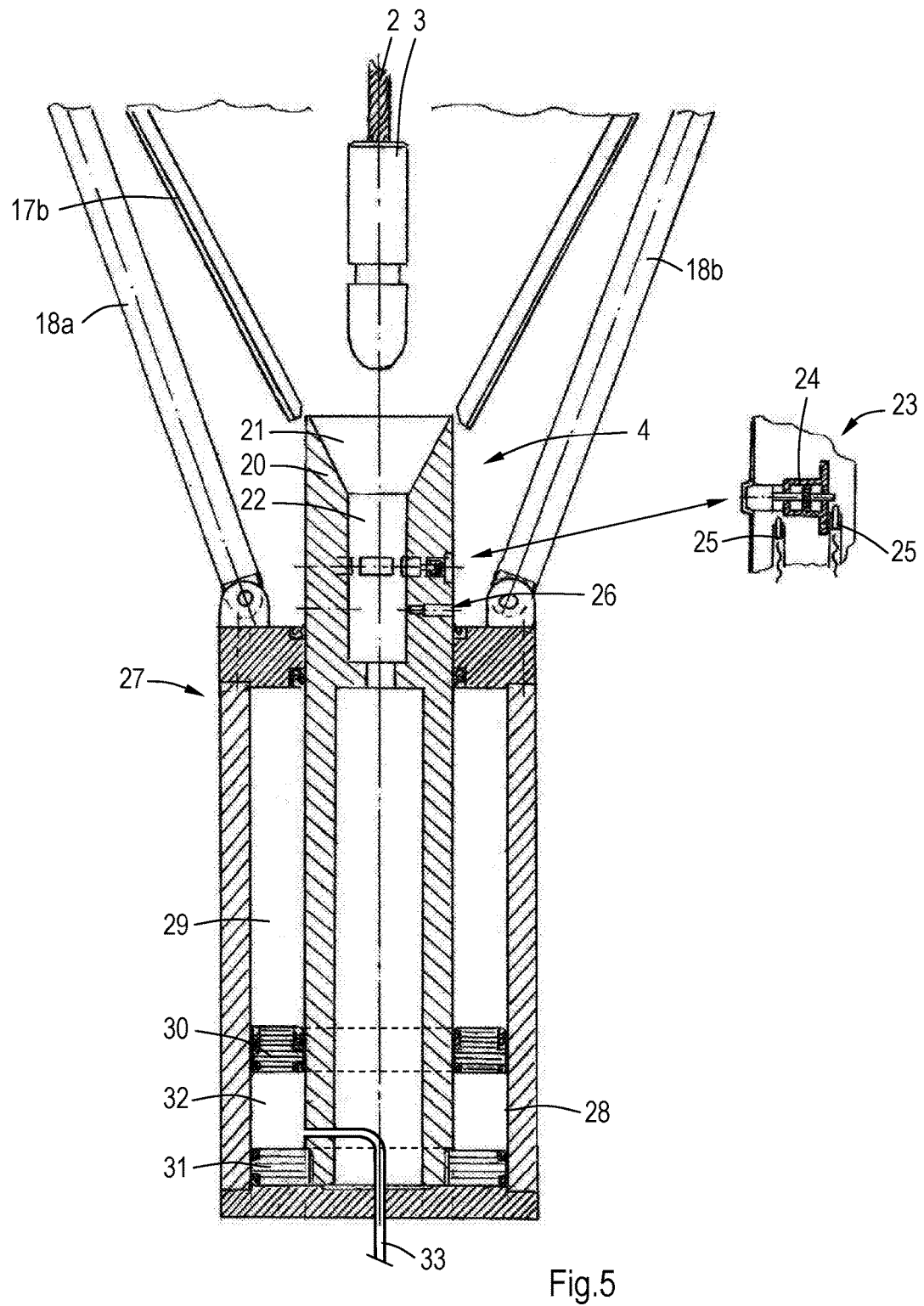
Figure 6A:
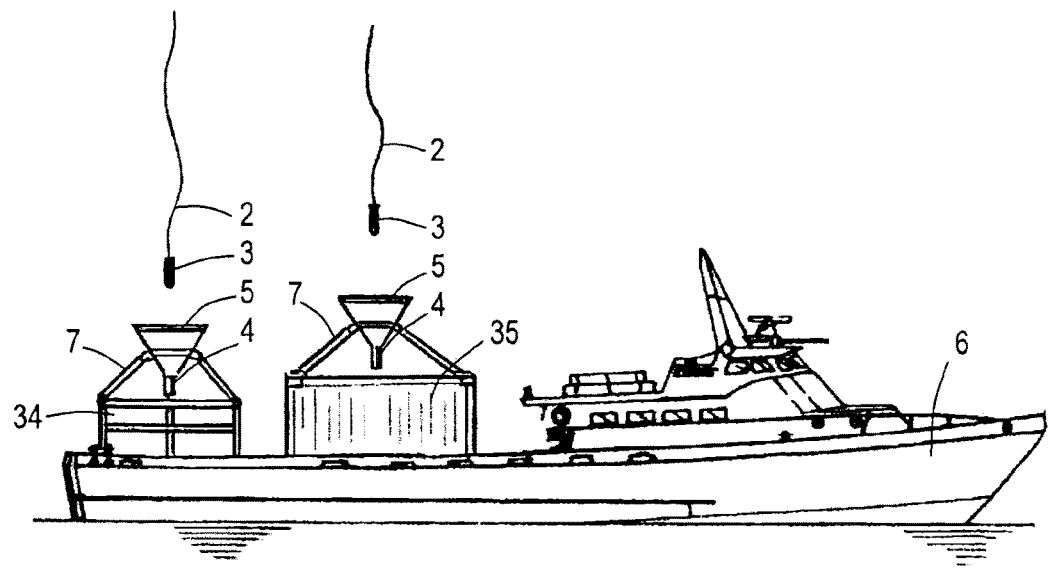
Figure 6B:
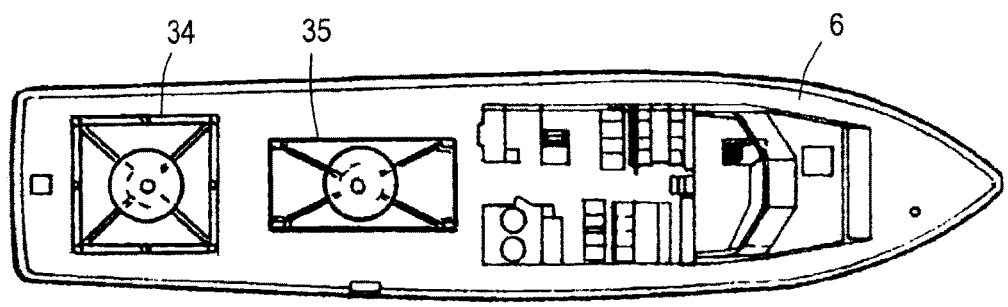
Figure 7:
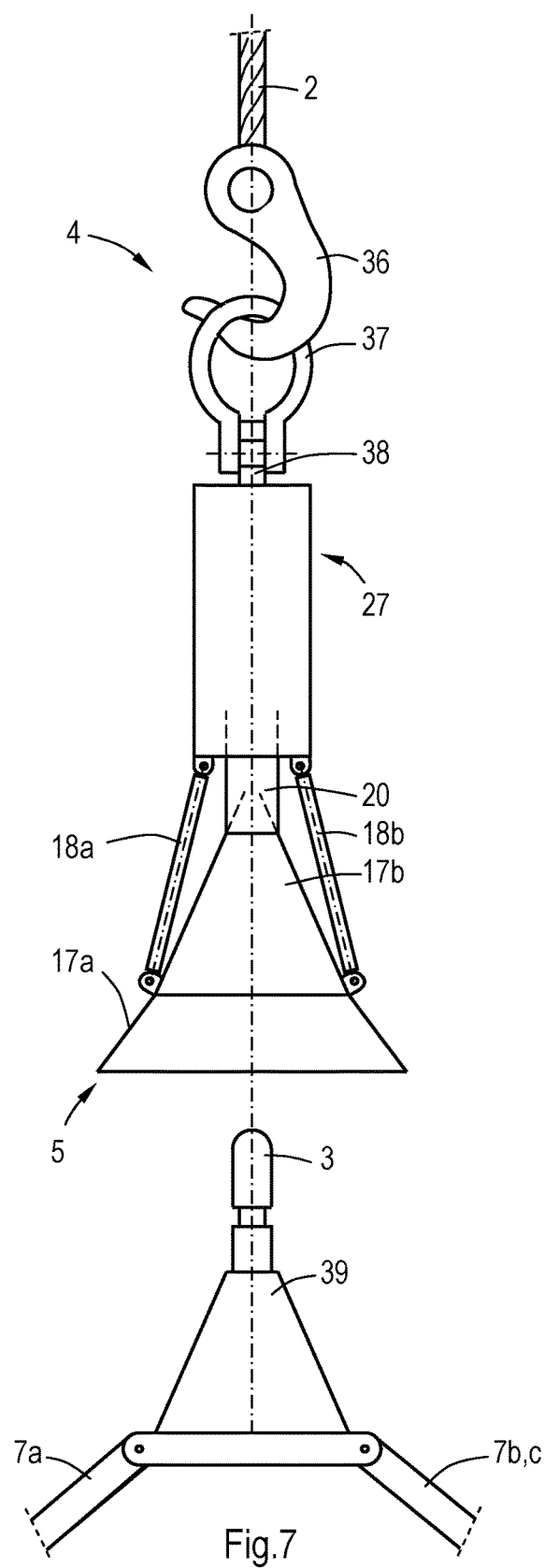

The invention will now be illustrated on the basis of preferred embodiments, referring to the accompanying drawings and merely as an illustration of the invention and not in limitation thereof. In the drawings, similar parts are given identical reference numerals, and:

FIG. 1 shows, schematically, a side-view in elevation of an embodiment of a system according to the invention, with the connector catch assembly with trap-cage mounted on a sea-craft, the cabin of the sea-craft not shown, FIGS. 2A and 2B show a side view resp. a top view of a sea-craft of FIG. 1, with the cabin shown and now an actuator in one leg, FIGS. 3A and 3B show a side view respectively a top view of a second sea-craft with an embodiment of an assembly according to the invention mounted, FIG. 4 shows a side view, partially in cross-section, of the detailed assembly according to the invention, FIG. 5 shows a cross-sectional view of the connector body and connector catch of FIG. 1, with heave compensation built in, FIGS. 6A and 6B show a side view respectively a top view of a transport vessel with a shipping container on deck and on top of the shipping container in an embodiment of an assembly of a system according to the invention, and FIG. 7 shows a side view of a part of a mechanically reversed embodiment of the system according to the invention, with the connector catch and its funnel shaped trap-cage fixed to the hoisting cable.

In FIG. 1, a hoisting system S for lifting and lowering loads comprises a hoisting crane 1 with a hoisting cable 2 and a connector body 3 attached to the cable 2. The system S also comprises a connector catch 4 mounted below a trap-cage 5 with the shape of a funnel or truncated cone. The connector catch 4 and connector body 3 comprise means for mutually connecting them in a releasable manner, as will be clarified below.

The trap-cage 5 which may for example be cylindrical and the connector catch 4 are mounted on a craft 6 here by three legs 7a, 7b and 7c. As shown the vessel 6 floats on the water line 8. The wide side 9 of the funnel shaped trap-cage 5 is directed away from the sea-craft 6, upward, in order to be able to catch the connector body 3 hanging above it when the latter is being lowered, and to let the trap-cage guide the connector body 3 towards the connector catch 4, aided by gravity. In this illustrative embodiment the connector catch 4, the trap-cage 5 and possibly the legs 7a-c constitute a connector catch assembly CCA, as indicated by the dashed curve.

In FIGS. 2A and 2B, the sea-craft 6 is shown more clearly, with a wheel house 10 and the trap-cage 5 in this case mounted above the wheel house 10 on the three legs 7a, 7b and 7c, which legs 7a-c are mounted on the deck 11 at mounting lugs 12a, 12b respectively 12c.

In the leg 7a, a for example hydraulic actuator 13 enables an adjustment of the length of the leg 7a, and thereby allows for an adjustment of the axis of symmetry A of the trap-cage 5 and the connector catch 4. Since the connector catch 4 lies at a distance below the rotational center of the rotation induced by the leg's change of length, the change in orientation of the trap-cage 5 results in a repositioning of the connector catch 4 parallel to the deck 11, when the sea-craft 6 is suspended from the crane 1. As a result, it becomes possible to adjust the orientation of the deck 11, in particular its inclination with respect to the sea and hence to the horizontal plane, in the sense of raising its rear side with respect to its bow side, or alternatively lowering its rear side with respect to its bow side. This adjustment is useful for adjusting to changes in the position of the centre of gravity of the vessel, or of other objects to be lifted. Such changes occur, for example, when the sea-craft is consuming fuel or water present in its tanks (not shown), and/or when cargo (also not shown) is being repositioned on the sea-craft. In particular, the center of gravity of the sea-craft 6 may thus be brought in line with the hoisting cable 2 in order to obtain a deck that is horizontal.

In FIGS. 3A, 3B, a variant to the sea-craft 6 of FIGS. 2A, 2B are shown. The sea-craft 6 of FIGS. 3A, 3B are larger than that of FIGS. 2A, 2B, and serves as a crew tender, i.e. the sea-craft 6 serves to bring crew to and from platforms offshore, such as jack-up barges, to a harbor or other place e.g. wind turbines to be maintained. The legs 7a-c are mounted on a frame 14 comprising vertically extending lower legs 15a, 15b and 15c, connected on their top ends by rods 16a, 16b and 16c. The lower legs 15a, 15b and 15c are mounted to the deck 11 of the vessel 6. The operation of the assembly CCA is similar to that of FIG. 2. Due to the presence of the assembly CCA, it is possible to lift the whole craft including crew(s) safely on board of a platform or bigger vessel without a need for a dangerous operation of persons from the craft by rope ladder to deck, platform or vessel, as was required in the state of the art.

The trap-cage 5 is shown into more detail in FIG. 4. Here, it is visible that the trap-cage 5 wall 17a near the wide side of the trap cage 5 has a less steep inclination with the axis of symmetry A than the trap-cage 5 wall 17b near the narrow side of the trap cage 5. The connector catch 4 is partially shown, and fixed to the trap-cage 5 by means of three rods 18a, 18b and 18c (not shown), the upper ends of which share the connecting points 19a, 19b and 19c (not shown) near the trap-cage 5 with the top ends of legs 7a, 7b and 7c.

The connector catch 4 of FIG. 1 and FIG. 4 is shown into detail in FIG. 5. The connector catch 4 comprises a generally cylindrical tube 20, with a conical receiving end 21 serving to further guide the connector body 3 after it has left the trap cage wall 17 when it is being lowered. The conical receiving end 21 adjoins a housing part 22 that is designed to hold the connector body 3 in a fixed orientation with respect to the connector catch 4. The housing part 22 has a locking mechanism 23 that serves to lock the connector body 3 in the connector catch 4 and to release these two parts from each other. The locking mechanism 23 comprises, apart from a possibly hydraulically actuated lock 24 of a type that is known in the art, two electronic sensors 25 connected to control means (not shown), such as a digital computer, for checking the position of the lock 24.

Two further sensors 26 are mounted in the housing part 22 and serve to check the presence of the connector body 3 in the connector catch 4.

In FIG. 5, a heave compensation mechanism 27 comprises a cylindrical housing 28 around the hollow rod 20 serving as the connector catch 4, and thus the heave compensation mechanism 27 is integrated with the connector catch 4. The compartment 29 between the hollow rod 20 and the cylindrical housing 28 above a floating piston 30 is filled with gas. The floating piston 30 separates the gas from oil below it. The hollow rod 20 has at its lower end a main piston 31 which is mounted to hollow rod 20. The floating piston 30 is movable and sealed with respect to the hollow rod 20 and the cylindrical housing 28. The main piston 31 is movable with respect to the housing 28 and fixed to the hollow rod 20, and sealed with respect to both the hollow rod 20 and the cylindrical housing 28.

The construction of the cylindrical housing 28, hollow rod 20 and the gas enclosed in the compartment 29 serves as a gas spring, allowing the rods 18a-c and the cylindrical housing 28 to move relative to the hollow rod 20 of the connector catch 4 and the trap-cage 5 and connector body 3. In this manner, height variations of the rods 18a-c and the craft 6 fixed thereto, which height variations typically result from dwell and waves, will result in smaller variations of the tension in the hoisting cable 2 during lifting and lowering the craft 6, for instance when the vessel 6 is at a position where it is partially carried by the water below it and partially by the hoisting crane 1.

The stiffness of the resulting gas-spring is adjustable, by changing the amount of oil present in oil compartment 32 present between the pistons 30 and 31, via a canal 33 by means not shown but known per se in the art.

In FIGS. 6A, 6B, two instances of a connector catch assembly CCA similar to that of FIG. 1 are now mounted on a shipping container 34, in particular a sea shipping container, resp. an equipment transport cradle 35. The assemblies CCA in FIG. 6 differ from the assembly of FIG. 1 in that they each have four legs 7 and no hydraulic actuator 13 is present.

In FIG. 7 the trap-cage 5 and connector catch 4 together with the heave compensation mechanism 27 are now suspending from the hoisting cable 2 of the crane 1. On the cable 2 a hook 36 is attached whereon a shackle 37 and lifting eye 38 with thereon the mechanism 27. The connector body 3 is built on an intermediate support structure 39 held by connection legs 7a, 7bc elucidated above supported on and attached to a craft, container or some other load.

Variants to the embodiments shown of the invention, as defined by the claims below, are possible. For example, the funnel may have a rectangular cross-section, instead of a circular cross-section. Moreover, the number of legs may be larger than three, or just two legs may be used, or even one leg when the trap-cage 5 is for instance hinged to a fixed top part of the sea-craft. Also, the heave-compensation mechanism 27 may be interposed in the cable 2, or incorporated in the connector body 3, or even in the hoisting crane 1, instead of being integrated with the connector catch 4.

LEGEND

1 Hoisting crane
2 Hoisting cable
3 Connector body
4 Connector catch
5 Funnel shaped trap-cage
6 Craft
7a, 7b, 7c Legs
8 Water line
9A, 9B Wide and narrow side respectively of funnel trap cage
10 Wheel house
11 Deck
12 Mounting lugs
13 Actuator
14 Frame
15a, 15b and 15c Lower legs
16 upper extension frame; 16a, 16b and 16c Rods
17, 17a, 17b Wall
18a, 18b and 18c Rods
19a, 19b and 19c Connecting points
20 Cylindrical tube
21 Receiving end
22 Housing part
23 Locking mechanism
24 Locking actuator
25 Sensors
26 Sensors
27 Heave compensation mechanism
28 Heave compensation housing
29 Gas compartment
30 Floating piston
31 Main piston
32 Oil compartment
33 Canal
34 Shipping container
35 Transport cradle
36 Crane hook
37 Shackle
38 Lifting eye
39 Intermediate support structure
A Axis of symmetry
S Hoisting system
CCA Connector catch assembly

The invention claimed is:

1. A hoisting system, comprising:
a hoisting crane including a hoisting cable; and
a craft including a connector catch assembly to interconnect the hoisting crane and the craft or a load/cargo on the craft, the connector catch assembly including:
a connector body, and
a connector catch including a funnel-shaped trap-cage;
wherein one of the connector body and the connector catch is attached to the hoisting cable and the other of the connector body and the connector catch is attached to the craft or the load/cargo on the craft,
wherein a wide side of the funnel shaped trap-cage is directed toward the connector body on approaching one another, whereas an opposite narrow side of the funnel shaped trap-cage includes the connector catch mounted herein to releasably hold the connector body, and
wherein at least one leg extending between the craft and the connector catch assembly to support the connector catch assembly, the at least one leg extending at an angle with the central axis of the funnel of the trap-cage, the at least one leg having an adjustable length to adjust an angular orientation of the trap-cage and thereby two-dimensionally adjust the position of the connector catch in the direction perpendicular to the central axis of the funnel of the trap-cage.

2. The system according to claim 1, further comprising a heave compensation mechanism to reduce tension peaks in the hoisting cable occurring due to movements of the hoisting crane.

3. The system according to claim 2, wherein the heave compensation mechanism includes a gas-spring, or a gas-spring having an adjustable stiffness.

4. The system according to claim 2, wherein the heave compensation mechanism is integrated with the connector catch.

5. The system according to claim 1, wherein the funnel shaped trap-cage has an opening angle that decreases towards the narrow side of the funnel.

6. The system according to claim 1, wherein the at least one leg forms an acute angle with the central axis of the funnel of the trap-cage.

7. A connector catch assembly to interconnect a hoisting crane and a craft or a load/cargo on the craft, the connector catch assembly comprising:
a connector body;
a connector catch comprising a funnel-shaped trap-cage having opposite sites; and
at least one leg extending between the craft and the connector catch to support the connector catch, the at least one leg extending at an angle with a central axis of the funnel-shaped trap-cage, the at least one leg having an adjustable length to adjust an angular orientation of the trap-cage and thereby two-dimensionally adjust a position of the connector catch in the direction perpendicular to the central axis of the funnel-shaped trap-cage;
wherein one of connector body and the connector catch is attached to the hoisting crane and the other of the connector body and the connector catch is attached to the craft or the load/cargo on the craft, and wherein a narrow side of the funnel shaped trap-cage has the connector catch mounted therein to releasably hold the connector body.

8. The connector catch assembly according to claim 7, further comprising a heave compensation mechanism to reduce tension peaks in the connector catch assembly when suspended and carrying an object, the heave compensation mechanism provided at the narrow side of the funnel shaped trap-cage and having the connector catch connected thereto.

9. The connector catch assembly according to claim 8, wherein the heave compensation mechanism comprises a gas-spring.

10. The connector catch assembly according to claim 9, wherein stiffness of the gas-spring is adjustable.

11. The connector catch assembly according to claim 7, mounted on at least one leg that extends at an angle with the central axis of the funnel of the trap-cage, wherein the at least one leg has an adjustable length to adjust an angular orientation of the trap-cage and thereby adjust the position of the connector catch in the direction perpendicular to the central axis of the funnel of the trap-cage.

12. The connector catch assembly according to claim 7, wherein the trap-cage has an opening angle that decreases towards the narrow side of the funnel.

13. The connector catch assembly according to claim 7, wherein the at least one leg forms an acute angle with the central axis of the funnel-shaped trap-cage.

\* \* \* \* \*